United States Patent [19]

Nakamoto et al.

[11] 4,245,900
[45] Jan. 20, 1981

[54] ELECTRONIC EXPOSURE CONTROL APPARATUS

[75] Inventors: Soichi Nakamoto, Miachida; Fumio Ito, Yokohama; Yasuo Isobe, Kawasaki; Tadashi Ito, Yokohama, all of Japan

[73] Assignee: Canon Kabushiki Kaisha, Tokyo, Japan

[21] Appl. No.: 864,479

[22] Filed: Dec. 27, 1977

Related U.S. Application Data

[63] Continuation of Ser. No. 668,720, Mar. 19, 1976, abandoned.

[30] Foreign Application Priority Data

Mar. 7, 1973 [JP] Japan .................................. 48-26695
Apr. 26, 1973 [JP] Japan .................................. 48-47902
Apr. 26, 1973 [JP] Japan .................................. 48-47904

[51] Int. Cl.$^3$ .......................................... G03B 7/097
[52] U.S. Cl. ................................. 354/23 D; 354/38
[58] Field of Search ................... 354/23 D, 24, 29, 38, 354/43, 44, 50, 51, 60 A

[56] References Cited

U.S. PATENT DOCUMENTS

| 3,703,130 | 11/1972 | Watanabe | 354/24 |
| 3,748,979 | 7/1973 | Wada | 354/50 |
| 3,824,608 | 7/1974 | Toyoda | 354/23 D |

Primary Examiner—Michael L. Gellner
Assistant Examiner—William B. Perkey
Attorney, Agent, or Firm—Toren, McGeady and Stanger

[57] ABSTRACT

An electronic exposure control apparatus for a camera includes a setting means to set the exposure factor, a compression means connected to the setting means, for compressing the above-mentioned exposure factor logarithmically and an analogue-digital conversion means, being connected to said compression means, and generating a pulse number which corresponds to the output from the compression means. Also included is a first counter, which is connected to the output of the above-mentioned analogue-digital conversion means, for counting the pulse number from the above-mentioned analogue-digital conversion means, a pulse generating means, a binary counter having plural number of bits and connected to the output of the above-mentioned pulse generating means, wherein the counter counts the pulse number from the above-mentioned pulse generating means in association with shutter release, and the output of the counter is connected to the first counter for resetting the memorized content of the first counter. A coincidence detection means is connected to the output of the binary counter, wherein the means generates signals when the memorized content of the first counter is reset, and a control means is connected to the above-mentioned coincidence detection means, wherein the opening and closing of shutter is controlled by the signal from the above-mentioned coincidence detection means.

3 Claims, 2 Drawing Figures

ELECTRONIC EXPOSURE CONTROL APPARATUS

This application is a continuation of application Ser. No. 668,720, filed Mar. 19, 1976, now abandoned; which is a continuation of application Ser. No. 446,758, filed Feb. 28, 1974, now abandoned.

BACKGROUND OF THE INVENTION

1. Field of the Invention

The present invention is related to an electronic exposure control apparatus of a single lens reflex camera, particularly to an electronic exposure control apparatus having an electronic shutter formed by a digital circuit which is digitally extended using the register.

2. Description of the Prior Art

In a conventional single lens reflex camera when automatic exposure control is performed by TTL photo-sensing, since photo-sensing is suspended during the exposure of camera, as is well known, the brightness of an object just before exposure is detected and memorized and exposure control is performed based on this memorized value. For employment in such a device, that a capacitor is used as a means to memorize the brightness of an object and the analogue amount of charge in terms of voltage is memorized by the capacitor. In another type of device, a register formed by flip-flop circuits is used to memorize the brightness as a digital amount.

In the former method in which a capacitor is used to memorize analogue amount, the brightness of an object being electrically converted is compressed to several volts or less using a compression diode and is memorized with the use of a power source battery which is ordinarily used. Particularly in such device, a circuit to convert the memorized voltage to exposure time is an analogue circuit using a semi-conductor. Therefore, the device has certain shortcomings in that it is apt to be influenced by temperature variation and variation in power source voltage and the memorized voltage cannot be converted to proper exposure time. In addition even when a compensation circuit, etc. is provided, this influence cannot be sufficiently compensated.

On the other hand, a method to digitally memorize object information using a register is disclosed in the Japanese Patent Publication No. Sho 45-4903, and in this method, as the object information is digitally memorized in a register, it will not be influenced by temperature variation and power source voltage variation. However, since the object information is memorized in a register in a compressed manner for reducing the number of bits in the register, the output of the register needs to be expanded to convert what is memorized in the register to exposure time. But, since a circuit for this expansion purpose is an analogue circuit, it is apt to be affected by temperature variation, and power source voltage variation as in the former case, and it is difficult to obtain correct exposure time.

SUMMARY OF THE PRESENT INVENTION

An object of the present invention is to provide a device in which the above mentioned shortcomings are eliminated, thus to provide an electronic shutter to digitally expand the content of the register memorizing the object brightness information being compressed.

Another object of the present invention is to provide an electronic shutter in which an indication means is connected to an output end of the expansion circuit to digitally expand the content of the register.

Still another objects of the present invention will be apparent from the detailed explanations in which the invention is explained together with the drawings.

DESCRIPTIONS OF THE EMBODIMENTS OF THE INVENTION

Figure 1:
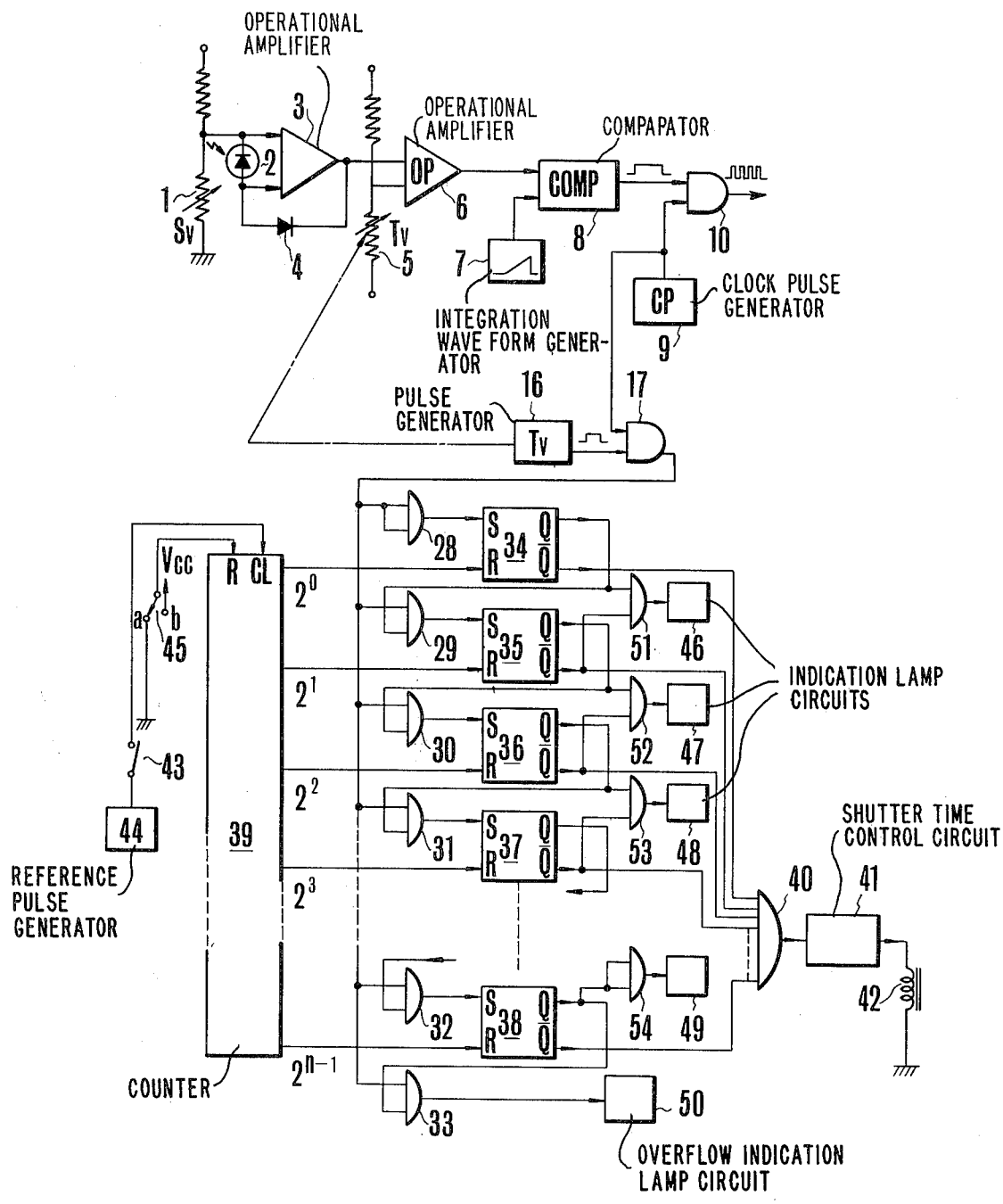
FIG. 1 is a block diagram to show one example of an electronic exposure control apparatus of the present invention.

FIG. 1 is a block diagram to show an example of an electronic shutter control device of the present invention. In this figure, 1 is a variable resistor adjustable for film sensitivity, 2 is a light receiving element such as a CdS, silicon blue-cell (SBC), etc. to receive the light from an object and output photocurrent, 3 is an operational amplifier to which the output terminal of said light receiving element is connected, 4 is a diode having compressive characteristics being connected between the input terminal and the output terminal of the operational amplifier 3, 5 is a variable resistor varied by setting shutter time, 6 is a second operational amplifier being connected to the output terminal of the above mentioned operation amplifier and the shutter time setting variable resistor 5. 7 is an integration waveform generator, 8 is a comparator to compare the outputs of the above mentioned operational amplifier 6 and of the integration waveform generator 7 and to generate a pulse length which corresponds to length of time required until the outputs of 6 and 7 coincide. 9 is a clock pulse generator and the oscillation frequency thereof can be varied. 10 is an AND gate, and a pulse number which corresponds to a proper diaphgram aperture value will be generated at its output. 16 is a pulse generator which generates a pulse having a pulse width which corresponds to shutter time information by setting of shutter time, and is composed of each of the above mentioned circuits 5, 6, 7 and 8. 17 is an AND gate having a similar function as that of the above mentioned AND gate 10.

The output of the AND circuit 17 applied to the plural number of AND gates 28 to 33. The outputs of the AND gates 28 to 33 are connected to the set terminals S of a plural number of flip-flop circuits 34 to 38, respectively. The reset terminals R of these circuits 34 to 38 are connected to each of bits $2^0$, $2^1$, ... of a binary counter 39. One of the output terminals Q at each of the circuits 34 to 38 is connected to the AND gate of the next stage, respectively, while the other output terminals $\overline{Q}$ are supplied to the AND gate circuit 40. The shutter time control circuit 41 composed by, for example, a Schmitt circuit is actuated by the output of the circuit 40, and by the same, a shutter closing member is driven by a magnet 42. A reference pulse is added to the input terminal CL of the above mentioned binary counter from a reference pulse generator 44 through a switch 43, and a reset switch 45 is connected to the reset input terminal R. The output of the AND gate 33 is connected to an overflow indication lamp circuit 50 while the outputs Q, $\overline{Q}$ of each flip-flop circuit are connected to indication lamp circuits 46 to 49 through AND gates 51 to 54.

Next, the function of this device will be explained. First in a first state wherein there is no output pulse from the AND gate 17, the flip-flop circuits 34 to 38 are all reset and their outputs will be such that Q is "0," and $\bar{Q}$ is "1." As a shutter dial (not shown in the drawing) of a camera is rotated to set the same at a desired shutter time, shutter time information will be inserted into the resistance 5 in association therewith. As film sensitivity information is set at the resistance 1 beforehand, a voltage which corresponds to film sensitivity and object brightness information is provided as an output from the operation amplifier 3. Therefore, the output of the second operation amplifier 6 corresponds to the proper diaphragm aperture value. Of course, the output of the amplifier 6 is logarithmically compressed as the diode 4 and the resistance 5 with its resistance value varying logarithmically are used. For example, as a photo-sensing starting switch (not shown in the drawing) is actuated, an integrated waveform with a linearly increasing slope is provided from 7, and at the same time, the output of the comparator 8 becomes 1. As the output voltage of the generator 7 increases and becomes equal to the output of the amplifer 6, the output of the comparator 8 again becomes 0. By this operation such pulse number, since it is equal to the pulse number from the generator 9 being supplied while the output of the comparator 8 is 1, is provided as an output from the AND gate 10. On the other hand a pulse number corresponding to the set shutter time is provided as an output from the AND gate 17.

The first pulse of said output pulse signal AND gate 17 goes through the AND gate 28 and is impressed on the set input S of 34, and in the output of 28, Q is inverted to "1" and $\bar{Q}$ is inverted to "0." When the next output pulse (second pulse) is sent out, the AND gate 29 becomes ON by said pulse and the Q "1" pulse from 34 and the second pulse is provided as an input into the S input of 35. By this, 35 is inverted and Q becomes "1" while $\bar{Q}$ becomes "0." Then, thereafter everytime the output pulse from AND gate 17 is sent out, the flip-flop circuits will be set in turn in the order of 34, 35 . . . and as great a number of FF circuits as the number of output pulses will be set.

The output of the flip-flop circuits, which have been set according to the number of output pulses from the AND gate 17 as mentioned above, will be such that Q is "1" and $\bar{Q}$ is "0." Each of the $\bar{Q}$ outputs of the flip-flop circuits is provided as as input into the gate circuit 40 forming an AND gate so that the shutter time control circuit 41 is controlled by the output to actuate the magnet 42. But, since the Q output of the flip-flop circuit being set by the output pulse from the AND gate 17 is then "0," the AND gate 40 under such state will be OFF and a control signal will not be sent to the control circuit 41.

Next the binary counter 39 is reset, for example, by having the switch 45 connected momentarily from terminal a to terminal b at the time of the film wind-up. Therefore, in this state, the signal for the reset input R of each flip-flop circuit will not se sent from each output of the counter. When the shutter release button is further pressed down to a second step, the engagement of the shutter front screen is released. The switch 43 is actuated at the same time the shutter front screen starts moving, and pulses with predetermined cycle period will be sent to the binary counter 39 from the reference pulse generator 44.

For example, if the cycle of the reference pulse is selected as 1 ms (1/1000 second), a reset signal is generated at the first bit $2^0$ of the binary counter in 1/1000 second after the shutter front screen starts moving, and it is sent to the reset input of the flip-flop circuit 34 to reset the FF circuit. By this, the output Q is inverted to "0" and $\bar{Q}$ to "1." A reset signal will be sent successively to the reset input of the flip-flop circuit in such manner that the second bit $2^1$ of the binary counter circuit is after $1/1000\times2=1/500$ second and the third bit $2^2$ is after $1/1000\times2^2=1/250$ second, . . . When there are four output pulses from the OR gate 14, the circuits 34 to 37 are in a set state, and the flip-flop circuits in the stages thereafter will be in a reset state. In this state, as the output of the binary counter resets FF1 to FF4 in turn at predetermined intervals, the time required for the fourth bit $2^3$ of the counter to reset the circuit 37 will be $1/1000\times2^3=1/125$ second after the shutter starts moving, and at this time, the AND gate 40 is actuated and the magnet 42 is actuated by the control circuit 41 to close the shutter. Thus, exposure with 1/125 second will be made.

As has been explained above, according to the present invention the arithmetical digital information (the pulse number from the AND gate) which is obtained by operating the logarithmically compressed information (the output of the amplifier 6) is expanded by a binary counter circuit to obtain a series of shutter speeds which are multiples of one another (1/1000 second, 1/500 second, 1/250 second, . . . 1, 2, 4 . . . ).

It is possible to provide gate circuits 51 to 54 to AND the Q output at the front stage of the flip-flop circuit and the $\bar{Q}$ output at the latter stage as is shown in the drawing for driving the lamp driving circuits 46 to 49 by their outputs, thereby digitally indicating shutter time beforehand with a lamp. It is also possible to vary the illuminating color of said indication lamp to facilitate the identification of high speed shutter and low speed shutter.

Next a device of the present invention, in which such control circuit is added as enabling the change over to be made between diaphragm preference and shutter preference, will be explained using FIG. 2. Like parts as those in FIG. 1 will be identified by like numbers.

Figure 2:
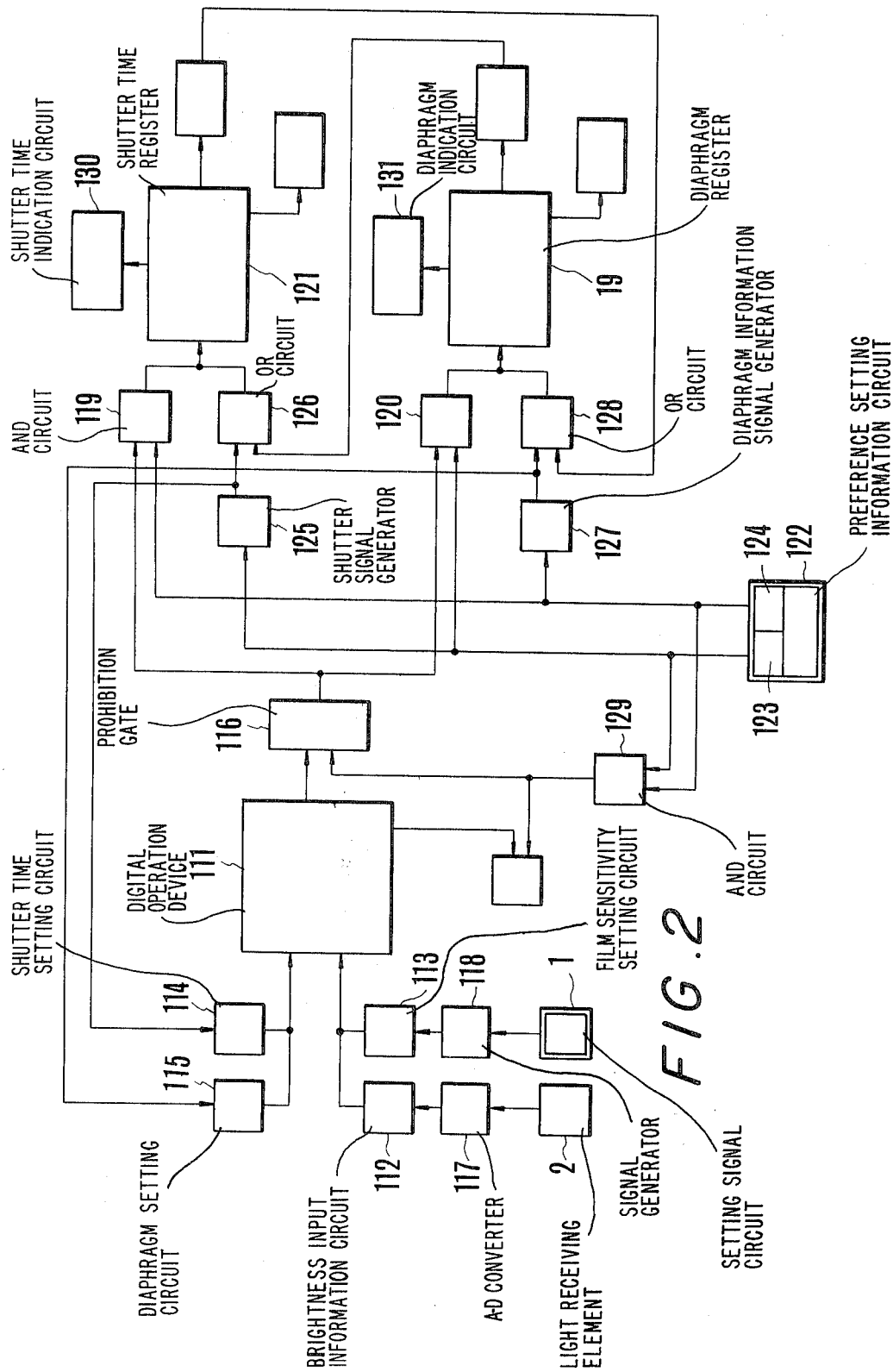
FIG. 2 is block diagram to show the second example of an electronic exposure control apparatus of the present invention.

In FIG. 2, the outputs of a brightness input information circuit 112, a film sensitivity setting information circuit 113, a shutter time setting information circuit 114, and a diaphragm setting information circuit 115 are connected to the input of a digital operation device 111, and either the proper diaphragm aperture information or shutter time information is provided as an output from the output of said operation device and passes through a prohibition gate 116 since such a number of pulse trains with even intervals corresponds to said set information. The purpose of the brightness input information circuit 112 is to place the light receiving element 2 (consisting of photo-conductive element such as CdS cell, PbS cell, etc., or photo-electromotive force element such as photodiode, photo-transistor, etc.) at such position so as to receive the light of an object. The element 2 also is intended to logarithmically compress the analogue output thereof and supply the same to the input of an AD converter circuit 117 composed of the elements 7, 8, 9 and 10 in FIG. 1 the AD converter then converts the same to a linear digital pulse which is proportional to and corresponds to the analogue signal level and supplies the pulse signal thereof to the input of the operation device 111.

The film sensitivity information circuit 113 functions, as the information circuit 112, to linearly impress into the operation device 111 through the information circuit 113 itself, the digital pulse which is proportional to the film sensitivity by a signal generator 118. Signal generator 118 is composed of the elements 7, 8, 9 and 10 shown in FIG. 1 and has a function to convert to digital information the analogue signal of the setting signal 1 which sets in the film sensitivity used. The output of the operation device 111 is supplied to a shutter time register 121, a diaphragm register 19 which is composed of the parts 28 to 45 shown in FIG. 1, through AND circuits, 119 and 120 respectively.

On the other hand, the output of a preference setting information circuit 122 is applied to the other input of the above mentioned AND circuits 119 and 120 and, at the same time, a shutter preference information circuit part 123 has a number of pulses, which correspond to the set shutter time as is added to a shutter information signal generator 125 which is composed of the elements 7, 8, 9 and 10 shown in FIG. 1 is, added to the shutter time setting information circuit 114 and the OR circuit 126, and the output of the above mentioned OR circuit 126 is added to the shutter time register 121.

Similarly, a diaphragm preference information circuit part 124 has a number of pulses which correspond to the diaphragm aperture which has been added to a diaphragm information signal generator 127. The latter is composed of the elements 7 to 10 shown in FIG. 1 and has been set, added to the diaphragm setting information circuit 115 and the OR circuit 128, and the output of the above mentioned OR circuit 128 is added to the diaphragm register 19.

The contents of the above mentioned registers are respectively sent to the shutter time indication circuit 130 and the diaphragm indication circuit 131 being composed of the parts 46 to 54 shown in FIG. 1 to indicate the photographing information and at the same time to effect the shutter control and the diaphragm control, respectively, with said content.

The device is so composed that both outputs for shutter and diaphragm of the above mentioned preference set information circuit are applied to the AND circuit 129 and the output is sent to the prohibition gate 116, and at the same time to send the output to a zero signal indication near the operating device. Now, the operation of the circuits will be explained in detail following each preference setting.

(1) In the case of shutter preference:

When, for example, the indication marked on the shutter dial is made to have the position of A (auto) set at any desired shutter speed by rotating a dial, a signal is issued to the shutter preference setting information circuit 123, and a number of pulses which correspond to the shutter speed, which has been sent to and set at the AND circuits 129, 120 and the shutter signal generator 125, is sent to the OR circuit 126 and the shutter time setting information circuit 114.

On the other hand, the brightness input information 112 which supplies such pulses compress the output of light receiving element and are converted from analog to digital information and are in proportion with the logarithm of brightness, and the film sensitivity setting information 113 generated by film sensitivity setting are added to one of the inputs of the operation device 111. The above mentioned shutter time setting information is added to the other one of the inputs, and from the operation device 111, a proper diaphragm aperture information output AV is provided as an output as a number of pulse train signal which corresponds to the diaphragm aperture information. While the provided diaphragm aperture signal is sent through the prohibition gate circuit 116 to the AND circuits 119 and 120, and since input is not impressed on one of the AND circuit 119, the signal will not pass through this circuit, but instead passes through the AND circuit 120 and is sent to the diaphragm register. By application of the signal of the diaphragm register for example, a step motor, etc. is driven and the diaphragm is stepped down. When it falls outside of the linked movement zone of the diaphragm, signal is fed back by the signal outside the linked movement zone and is sent to the OR circuit 126 to reset the once set shutter time so that proper exposure can be obtained. Of course, it is possible to issue a warning signal only without providing feedback and to reset manually.

(2) In the diaphragm preference case:

Since the function of the diaphragm preference is entirely equivalent to the case of shutter preference, with the shutter preference signal being replaced with the diaphragm preference signal, explanations will be omitted.

(3) In the manual shutter case:

When the shutter dial, the diaphragm ring are set at any desired value except A, EE, respectively, both the shutter preference signal circuit part 123 and the diaphragm preference signal circuit part 124 have their outputs generated and, as has been described above, have reset both the shutter register 121 and the diaphragm register 19. At the same time, signals are sent to the shutter time setting information circuit 114 and the diaphragm setting information circuit 115, and operation is performed other than with the brightness input information and the film sensitivity setting information. The output of the operation device will not be sent to the AND circuit since the prohibition gate circuit 116 works thereon. Since the operation device is composed to provide zero signal, when the shutter or the diaphragm is operated until the zero signal indication is lighted so that the operation device becomes zero, proper exposure can be made.

As has been explained above, in the electronic shutter control device according to the present invention, a number of pulses corresponding to the shutter time obtained by operation of logarithmic information is memorized and it is read out by the read out pulse from the binary (notation) circuit. Consequently, the shutter speed of a multiple series can be precisely and stably obtained, and the invention has great effect as a most advanced automatic exposure control system.

What is claimed is:

1. An exposure data control apparatus for a camera usable both for a shutter time preference mode and a diaphragm preference mode by selective change-over therebetween, comprising:

(a) shutter time register means for storing a digital signal corresponding to the shutter time value;
(b) diaphragm register means for storing a digital signal corresponding to the diaphragm value;
(c) first logic gate means for transferring a preferentially set shutter time value to said shutter time register means when the shutter time preference mode is selected, and which is connected to the input of said shutter time register means so as to transfer a shutter time value to be obtained as a result of an exposure operation when the diaphragm preference mode is selected; and (d) second logic gate means for transferring a preferentially set diaphragm value to said diaphragm register means when the diaphragm preference mode is selected, and which is connected to the input of said diaphragm to transfer a diaphragm value to be obtained as a result of the exposure operation when the shutter time preference mode is selected.

2. An exposure data control apparatus according to claim 1, wherein said first gate means includes an AND gate.

3. An exposure data control apparatus according to claim 1, wherein said second gate means includes an AND gate.

* * * * *